the most eco-

United States Patent Office
3,122,511
Patented Feb. 25, 1964

3,122,511
CRACKING CATALYST DEMETALLIZATION
Robert L. Foster, Homewood, Ill., assignor to Sinclair Research, Inc., Wilmington, Del., a corporation of Delaware
No Drawing. Filed Jan. 29, 1962, Ser. No. 169,588
7 Claims. (Cl. 252—413)

This invention is a method for improving the performance of catalyst in a hydrocarbon conversion system after deterioration of performance characteristics due to the accumulation of poisoning metal on the catalyst. The method is useful in conjunction with hydrocarbon conversion processes where the hydrocarbon feed is highly contaminated with nickel, iron and/or vanadium materials. The invention comprises removing the catalyst containing metal contaminants from the hydrocarbon conversion, treating the poisoned catalyst with a sulfiding vapor, chlorinating the catalyst at a moderate temperature, washing metal contaminants from the catalyst by the use of a particular aqueous medium and returning the catalyst, of reduced poisoning metals content and enhanced characteristics, to the hydrocarbon processing. The efficiency of the process for vanadium removal may sometimes be improved by contacting the catalyst at an elevated temperature with molecular oxygen-containing gas before sulfiding and may be given an alkaline wash after the regular aqueous wash. The aqueous medium contains a soluble chelating agent for metal poison.

Copending application Serial No. 849,199, filed October 28, 1959, now abandoned, and incorporated herein by reference, describes a treatment whereby iron and vanadium poisons on a hydrocarbon conversion catalyst are treated to convert these metals to volatile chlorine compounds and removed in vapor form from the catalyst. In the instant invention, however, the chlorinating conditions need not be sufficient to convert all of the poisoning metals to a volatile chloride form and little if any evolution of volatile chlorides need occur. The process of the invention may thereby avoid the corrosion problems which sometimes occur when chlorination is performed using a promoter, as described in the above-mentioned patent application.

Catalytically promoted methods for the chemical conversion of hydrocarbons include cracking, hydrocracking, reforming, hydroforming, coking, deasphalting, etc. Such reactions generally are performed at elevated temperatures, for example, about 300 to 1200° F., more often 600 to 1000° F. Feedstocks to those processes comprise hydrocarbons which at the temperature of the conversion reaction are generally in the fluid state and the products of the conversion frequently are lower-boiling materials. In particular, cracking of hydrocarbons is widely practiced and uses a variety of solid oxide catalysts to give end products of fairly uniform composition.

The catalysts which have received the widest acceptance today are usually activated or calcined, predominantly silica or silica-based, e.g. silica-alumina, silica-magnesia, silica-zirconia, etc., compositions in a state of very slight hydration and containing small amounts of acidic oxide promoters in many instances. Of these, the synthetic gel catalysts are more uniform and less damaged by high temperatures in treatment and regeneration. Popular synthetic gel cracking catalysts generally contain about 10 to 30% alumina. Two such catalysts are "Aerocat" which contains about 13% $Al_2O_3$ and "High Alumina Nalcat" which contains about 25% $Al_2O_3$, with substantially the balance being silica. Such catalysts are generally made by the precipitation of hydrous silicon, aluminum, etc. oxide precursors from aqueous solutions of compounds of the elements involved, followed by removal of free water and some, but not all, of the water of hydration. "Semi-synthetic" catalysts are made, for instance, by the precipitation of synthetic silica, alumina or silica-alumina gel on clay. One such semi-synthetic catalyst contains about equal amounts of silica-alumina gel and clay. The process of this invention is applicable to these catalysts which contain significant amounts of catalytic materials in the gel form, as well as "natural" catalysts, usually clays of the type of kaolinite or halloysite, which have been treated for the removal of undesired components such as iron and calcined.

The physical form of the catalyst varies with the type of manipulative process to which it will be exposed. In circulating catalyst systems, such as those of the fluid catalytic and "TCC" processes, catalyst moves through a reaction zone and then through a regeneration zone. In the fluid process, gases are used to convey a catalyst which is in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Various petroleum stocks have been known to contain at least traces of many metals and to pick up tramp iron from transportation, storage and processing equipment. Most of these metals, when present in a stock, deposit on the catalyst during the conversion process in the form of free metal or non-volatile metal compounds and probably in a characteristic pattern within the catalyst matrix, or lack of pattern as would be expected in an amorphous gel material, and regeneration of the catalyst to remove coke does not remove these contaminants. It is to be understood that the term "metal" used herein refers to either form of deposit. Some metals such as iron, nickel, vanadium, and copper markedly alter the selectivity and activity of cracking reactions if allowed to accumulate. A poisoned catalyst produces a higher yield of coke and hydrogen at the expense of desired products, such as gasoline and butanes. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any catalytic conversion unit will be a function of many factors including feedstock metal content, type and cost of catalyst, overall refinery balance, etc., and can be determined only by a comprehensive study of the refinery's operations. A further alternative, demetallizing the catalyst, which avoids discarding of expensive catalyst, and enables much lower grade, highly metals-contaminated feedstocks to be used, is now possible.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important therefore, that removing poisoning metals from the catalyst does not jeopardize the desired chemical and physical constitution of the catalyst and that the demetallization process does not involve such complicated procedures that the setting up of apparatus equivalent to that used in original catalyst manufacture would be required. Although methods have been suggested in the past for removing poisoning metals from a catalyst which has been used for high-temperature hydrocarbon conversions, for example, the processes of U.S. Patents 2,488,718; 2,488,744; 2,668,798 and 2,693,455; the process of this invention is effective to remove poisoning metals without endangering the expensive catalyst.

In this invention, the hydrocarbon petroleum oils utilized as feedstock for a conversion process may be of any desired type normally utilized in catalytic conversion operations and may contain much higher amounts of poisoning metals than generally are tolerable. The feedstock sometimes has as much as 30 or even 300 p.p.m. metal poisons and the catalyst may be used as a fixed, moving or fluidized bed or may be in a more dispersed state. The cracking normally is conducted at temperatures of about 750 to 1100° F., preferably about 850 to 950° F., at pressures up to about 200 p.s.i.g., preferably about atmospheric to 100 p.s.i.g., and without substantial addition of free hydrogen to the system to give a conversion of about 50–60 percent of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. In the process of this invention the regeneration of any particular quantum of catalyst is generally continued until the carbon content is less than about 0.5%. After regeneration subjecting the poisoned catalyst sample to magnetic flux may be found desirable to remove any tramp iron particles which may have become mixed with the catalyst.

After removal from the hydrocarbon conversion system, the catalyst is sulfided, chlorinated and washed. The chlorination removes or enables removal by the wash of nickel, vanadium and iron from the catalyst. Sulfiding, which has a large beneficial effect on nickel and iron removal, is performed before chlorination, by contacting the catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F. Other treating conditions can include a sulfur-containing vapor partial pressure of about 0.1 to 30 atmospheres or more, preferably about 0.5–25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix.

The chlorination is performed by contact of the poisoned catalyst with a gaseous chlorinating agent at room temperature up to a temperature of about 900° F., preferably about 400 to 650° F. The chlorination is effective for conversion of the poisoning metals to chloride removable in the later wash if not by volatilization during chlorination. The contact with the chlorinating agent may be at atmospheric pressure, or below or above. Subatmospheric pressures may be achieved by the use of vacuum or preferably by dilution with inert gas such as nitrogen or flue gas. Generally at whatever pressure is used, at least about 0.5 or 1 weight percent chlorinating agent, based on the catalyst, is employed. The upper limit is based on economics; no reason has been found to use more than about 10% chlorinating agent, but 25% or more could be used. The time of contact, of course, depends on the type and amount of agent supplied per unit time and is sufficient to give conversion of substantial nickel to nickel chloride and to substantially improve the effect of the subsequent wash on other poisoning metals. 15 minutes to 2 hours is a practical time range but the chlorination may be accomplished in 5 minutes or may take 5 or more hours. The contact with chlorinating agent may be followed by a purge with an inert gas such as nitrogen or flue gas to remove entrained chlorine.

It has been found that molecular chlorine vapors are in themselves sufficient to chlorinate the catalysts for subsequent removal of metal poisons by the chelating wash. The chlorination need not be sufficient to achieve a significant amount of volatilization of chlorides such as iron and vanadium chlorides. This invention, therefore, can produce a reduction in reagent costs as well as the elimination of corrosion problems sometimes experienced when a promoter such as those mentioned below is used in the chlorination. Also, the disposal of gas containing metal chloride vapor is not a problem, the effluent gas from the non-promoted process containing little more than $Cl_2$, HCl and perhaps small amounts of $SO_2$ and sulfur chlorides. Also, this effluent gas is suitable for recycle with little or no intermediate treatment. Because of the milder chlorination procedure useable in this invention less chlorine may be put on the catalyst, thereby affording less chance of catalyst damage in later stages of the demetallization process or in subsequent use of the catalyst for hydrocarbon conversion.

The chlorinating agent may be a vapor containing chlorine or sometimes HCl in combination with carbon or sulfur compounds. Mixtures of chlorine with, for example, a chlorine-substituted light hydrocarbon, such as $CCl_4$, may be used as such, or may be formed in-situ by the use of, for example, a vaporous mixture of chlorine gas with low molecular weight hydrocarbons such as methane, n-pentane, etc. The carbon or sulfur compound promoter would generally be used in the amount of about 1 to 5 or 10% or more, preferably about 2 to 3%, based on the weight of the catalyst for good removal of iron and vanadium by volatilization. A chlorinating gas comprising about 1 to 25 weight percent chlorine, based on the catalyst, together with 1% or more $S_2Cl_2$ gives good results. A "saturated" mixture of $CCl_4$ and $Cl_2$ or HCl can be made by bubbling chlorine or HCl gas at room temperature through a vessel containing $CCl_4$; such a mixture generally contains about 1 part $CCl_4$ to 5–10 parts $Cl_2$ or HCl.

The chlorinating agent is usually essentially anhydrous, that is, it has no separate water phase when in liquid form. As the amount of water in the agent increases, additional time and/or agent may be required to obtain a given amount of metal removal, probably due to decomposition of some of the chlorine by water, producing HCl. This harmful effect is also evident when water is present in the catalyst, so that it is preferred that the catalyst contain less than about 1 or 2% matter volatile at 1000° C.

The process of this invention improves catalyst performance by treating the catalyst with an aqueous medium containing a chelating agent. The agent advantageously is an organic carboxylic acid.

Aqueous solutions containing cyanide or hexametaphosphate ions are useful in forming soluble complexes with the pretreated poisoning metals. However, organic sequestering agents are preferred, since they form soluble chelate complexes with the metals and effectively retard redeposition of the poisoning metals on the catalyst surface once they are brought into solution. The chelating agents which are employed in this invention contain oxygen and frequently nitrogen as well. Among the nitrogen-containing agents the most popular is ethylene diamine tetraacetic acid (EDTA). Also, triethanolamine in alkaline solutions; polyethylene polyamino acids such as triethylene tetraamine tetraacetic acid and its homolog amino acids, certain epoxyamino acetic acid salts, amino derivatives of N-alkyl substituted aspartic acids and their functional derivatives and triammonium salts of monoisopropanol ethylene diamine triacetic acid have been reported as able to chelate heavy metal ions.

Other organic chelating agents are those organic acids having an available OH group close to a carboxyl group. The OH group may be an alcoholic hydroxyl or may be contributed by a second carboxyl group. Generally the COOH and OH groups will be separated by about 1–4 carbon atoms and will be in a cis relationship, that is capable of forming an inner anhydride, such as in maleic acid. The trans form of this acid, fumaric acid, does not chelate. The chelating agent molecule may be saturated or unsaturated and may be substituted with further COOH and/or OH groups or other substituents which do not have an adverse effect, such as alkyl or alkoxy, but should not contain substituents which may retard water solubility below the small solubility required to achieve the dilute chelating solution required for effectiveness. Among the suitable hydroxy acids are citric acid, tartaric acid, lactic acid and glycolic acid, while suitable dicarboxylic acids include oxalic, and maleic acids.

The chelating solution is neutral or acid, with a pH of about 1–7, advantageously 1–3. For reasons of water-solubility at this pH, as well as for economic reasons, citric acid or other hydroxy carboxylic acids are the preferred agents. The agent is used in amounts sufficient to give the desired removal of available metals from the catalyst, say about 0.1 to 10% chelating agent based on catalyst weight in solution in distilled or deionized water. The preferred amount is about 0.5 to 2.5%. Slurry concentrations from about 5 to 40% solids can be used with convenience in the washing step. The washing temperature can, for example, be 40 to 200° F. but preferably is about room temperature, that is, about 60 to 100° F. The slurry of catalyst in this chelating solution may be brought to this temperature by the heat imparted to the solution by the hot catalyst following its preliminary vapor treatment. During the washing, the catalyst can be stirred enough so that it is suspended in the solution. The chelating agent solution can be recycled after removal from the catalyst by passage through a suitable ion exchanger.

The effectiveness of the chlorination and aqueous treatment may sometimes be improved by treatment of the poisoned catalyst with molecular oxygen-containing gas for stabilization of metal, especially vanadium, in a higher valence state. This treatment is described in copending application Serial No. 19,313, filed April 1, 1960, and hereby incorporated by reference. The temperature of this treatment is generally in the range of about 1000 to 1800° F. but below a temperature where the catalyst undergoes any substantial deleterious change in its physical or chemical characteristics. The catalyst is in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst should be at least long enough to perform the stabilization of a substantial amount of vanadium. The treatment of the poisoned catalyst with molecular oxygen-containing gas is preferably performed at a temperature of about 1150 to 1350 or even as high as 1600° F. The upper temperature, to avoid undue catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment to a time just long enough not to damage the catalyst. The oxygen-containing gas used in the treatment contains molecular oxygen as the essential active ingredient. The gas may be oxygen, or a mixture of oxygen with inert gas, such as air or oxygen-enriched air. The partial pressure of oxygen in the treating gas may range widely, for example, from about 0.1 to 30 atmosphere, but usually the total gas pressure will not exceed about 25 atmospheres. Preferably a temperature of about 1200 to 1400° F. and a gas containing about 20–100% oxygen is employed at about atmospheric pressure.

Just before or just after the chelating wash it may be desirable to wash the catalyst with water, preferably distilled or deionized water, possibly to achieve further removal of poisons. Also, a wash with a basic aqueous medium as set forth in copending application Serial No. 39,810, filed June 30, 1960, incorporated herein by reference, may be employed. The pH of the wash is frequently greater than about 7.5 and preferably the solution contains ammonium ions. The solution preferably is substantially free, before contact with the catalyst, of any contaminant materials which would remain deposited on the catalyst. The ammonium ions may be $NH_4+$ ions or organic-substituted $NH_4+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the final aqueous wash, the catalyst is conducted to a hydrocarbon conversion system, although it may be desirable first to dry the catalyst filter cake or filter cake slurry at say 250 to 450° F. and also, as pointed out above, prior to reusing the catalyst in the conversion operation it can be calcined, say at temperatures usually in the range of about 700 to 1300° F. Drying the catalyst at a low temperature, for example, about 400° F., after washing, removes residual chloride on the catalyst, but the rate of evolution increases at higher temperatures. A short calcination at 1000° F. or higher effectively lowers chloride to an acceptable level (0.005%) and it is possible that chloride can be removed simply by adding the treated catalyst to the conversion unit regenerator.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. of poisoning metal will be accumulated on the catalyst before demetallization is warranted. The metal poison level at which the cracking system may operate without serious detrimental effects, and the metal poison level at which demetallization is most effective may vary with the type of catalyst employed. In the use of some catalysts demetallization and improvements in cracking are not significant unless about 1000 p.p.m. NiO and/or 1500 p.p.m. $V_2O_5$ are allowed to accumulate. A small portion of the catalyst is preferably removed from the hydrocarbon conversion system and given the oxygen treatment after the conventional oxidation regeneration which serves to remove carbonaceous deposits. The treatment of this invention is effective despite the presence of a small amount of carbon on the treated catalyst, but preferably hte regeneration is continued until the catalyst contains not more than about 0.5% carbon before the oxygen treatment. Where the catalyst is subjected to the oxygen treatment before it is substantially carbon free, the length of oxygen treatment, as recited above, is reckoned from the time that the catalyst reaches the substantially carbon-free state that is, the state where little, if any, carbon is burned even when the catalyst is contacted with oxygen at temperatures conductive to combustion.

In practicing this invention at the refinery, a portion of the poisoned catalyst can be removed from the hydrocarbon conversion system after being regenerated, and given a high temperature treatment with an oxygen containing gas for the length of time found to be sufficient to increase vanadium removal without damaging the catalyst. Then the catalyst may be maintained in a hydrogen sulfide or a hydrogen sulfide-inert gas mixture for one to three hours at temperatures approximating 1150° F. The sulfiding gas is purged from the catalyst by an inert gas, perhaps at a cooler temperature, then chlorinated in the temperature range outlined and washed with the aqueous medium containing the chelate. The treated catalyst can be returned to the unit, for example, to the regenerator, reducing greatly the new catalyst requirement. The amount of Ni, V or Fe removed in practicing the procedures outlined or the proportions of each which are removed may be varied by the proper choice of treating conditions. It may prove advantageous, in the case of very severely poisoned catalysts, to repeat the treatment to reduce the metals or otherwise improve catalytic activity to an acceptable level, perhaps with variations where one metal is greatly in excess.

The apparatus used to perform the process of the invention may be suitable for conducting part or all of the procedures with fluidized beds of finely divided catalyst in the various operations. When fluidized manipulations are to be used, the various gas or vapor treating agents described may be supplemented with inert fluidizing gases, such as nitrogen, where the flow of active gas is not sufficient for fluidization.

EXAMPLES

The following examples are illustrative of the invention but should not be considered limiting. In the examples, washing was conducted with a 20% slurry of catalyst in an aqueous medium comprising tap water. The washing was followed by filtration and reslurrying twice in tap water before a final rinse. Each catalyst sample was dried in an oven at about 500° F. before analysis and test cracking. Where a negative value is given for iron removal, the iron level increased, due to dispersion of tramp iron on the catalyst.

A "Nalcat" synthetic gel silica-alumina fluid-type cracking catalyst composed of about 25% $Al_2O_3$, substantially the rest $SiO_2$, was used in a commercial catalytic cracking conversion unit, using conventional fluidized catalyst techniques, including cracking and air regeneration to convert a feedstock (A) comprising a blend of Wyoming and Mid-Continent gas oils containing 1.0 p.p.m. Fe, 0.3 p.p.m. NiO, 1.2 p.p.m. $V_2O_5$ and about 2 weight percent sulfur. This gas oil blend had a gravity (API) of 24°, a carbon residue of about 0.3 weight percent and a boiling range of about 500 to 1000° F. When this catalyst had a poisoning metals content of 328 p.p.m. NiO, 4320 p.p.m. $V_2O_5$ and 0.288% Fe, a batch of this base catalyst No. 1 was removed from the cracking system after regeneration.

One batch of regenerated catalyst was subjected to a treatment with air under fluidizing conditions for two hours at 1300° F. and was divided into eight samples. Sample 5 was dumped into a solution in deionized water of 4% citric acid based on the weight of the catalyst. Samples 6 and 8–12 were treated with $H_2S$ under fluidizing conditions for one hour at 1175° F. and purged with nitrogen. Sample 6 was sent directly to a citric acid wash similar to that of sample 5. Sample 7, after the air treatment and samples 8–12 after sulfiding and purging were fluidized in chlorine gas at 600° F. for one hour and again purged with nitrogen. Samples 7 and 8 were then washed in a 4% citric acid solution. Sample 9 was washed in a 2% citric acid solution and sample 10 in a 0.67% citric acid solution. Sample 11 was washed with a solution providing 0.13% citric acid. After this wash, the catalyst sample was contacted with a solution which provided 2% $NH_4OH$ based on the catalyst. Sample 12 was treated with a wash solution providing both 0.67% citric acid and 2% $NH_4OH$. All slurries contained about 20% solids. The other batch of regenerated catalyst was subjected to chelation by immersion as a 20% solids slurry in a solution containing 4% citric acid based on catalyst weight for 10 minutes at room temperature without a preliminary treatment with molecular oxygen-containing gas. Samples 1, 2 and 3 were sulfided with $H_2S$ for 4 hours at about 1300° F. Sample 1 after sulfidation and sample 4 without sulfidation were exposed to chlorine gas for one hour at about 600° F. Sample 3 after sulfidation was exposed to chlorine gas for one hour at 75 to 120° F. The metals removal resulting from these treatments is reported in Table I.

Table I

| Sample | 1 | 2 | 3 | 4 | 5 | 6 | 7 | 8 | 9 | 10 | 11 | 12 |
|---|---|---|---|---|---|---|---|---|---|---|---|---|
| Oxygen treatment | no | no | no | no | yes | yes | yes | yes | yes | yes | yes | yes |
| Sulfiding | yes | yes | yes | no | no | yes | no | yes | yes | yes | yes | yes |
| Chlorination | yes | no | yes | yes | no | no | yes | yes | yes | yes | yes | yes |
| Percent Citric Acid (on catalyst) calculated as the monohydrate | 4 | 4 | 4 | 4 | 4 | 4 | 4 | 4 | 2 | 0.67 | 0.13 | 0.67 |
| Percent NH₄OH | | | | | | | | | | | 2 | 2 |
| Percent Metals Removal: | | | | | | | | | | | | |
| Ni | 91 | 28 | 92 | 0 | 11 | 48 | 7 | 69 | 72 | 68 | 72 | 44 |
| V | 23 | 2 | 28 | 5 | 9 | 16 | 12 | 21 | 22 | 10 | 21 | 11 |
| Fe | 50 | 2 | 54 | 1 | ¹−1 | 0 | ¹−4 | 23 | 23 | 9 | ¹−8 | 10 |

¹ Fe level increased, due to deposition of Fe from tramp iron on the catalyst.

Table I shows the results on catalyst metals content of the treatment with a chelating agent according to the proces of this invention. Samples 1, 3 and 8 to 12 show that a citric acid wash is effective for removal of nickel and vanadium from a catalyst which has been given the sulfiding and chlorination treatment. A comparison of sample 1 with sample 2 or a comparison of sample 6 with sample 8 shows that in each situation a chlorination treatment before the chelating wash improves metal removal. Likewise, a comparison of sample 3 with sample 4 or a comparison of sample 7 with sample 8 shows sulfiding to have a large effect on metal removal. Both sulfiding and chlorination appear to have an effect on iron removal. The data in this table also show that iron removal is considerably improved by a citric acid concentration of over about 0.5%.

Another batch of base catalyst No. 1 was removed from cracking feedstock A after regeneration and a sample was used to test-crack a petroleum hydrocarbon East Texas gas oil fraction (feedstock B) having the following approximate characteristics:

| | |
|---|---|
| IBP (° F.) | 490–510 |
| 10% | 530–550 |
| 50% | 580–600 |
| 90% | 650–670 |
| EP | 690–710 |
| Grav. (API), ° | 33–35 |
| Visc. (SUS) at 100° F. | 40–45 |
| Aniline point ° F. | 170–175 |
| Pour point ° F. | 35–40 |
| Sulfur percent | 0.3 |

The results of this cracking are given in Table II below. The rest of the batch was treated with air, hydrogen sulfide and chlorine under the conditions recited for sample 8 and then divided into samples 49, 64, 65 and 66. The latter three samples were washed with deionized water containing citric acid in the proportion to catalyst recited in Table II, then washed with an NH₄OH solution. Each sample was then washed with deionized water until there was no evidence of further metals removal, then dried at 600° F. and used in the test cracking of feedstock B. The amount of poisoning metals removed by the treatment and the results of the cracking tests are given in Table II.

Table II

| Sample | Base | 49 | 64 | 65 | 66 |
|---|---|---|---|---|---|
| Percent citric acid | | | 0.33 | 0.67 | 4 |
| Percent NH₄OH | | | 2 | 2 | 2 |
| Percent metal removed: | | | | | |
| Ni | | 66 | 71 | 70 | 68 |
| V | | 4 | 23 | 23 | 22 |
| Fe | | −12 | 1 | 15 | 20 |
| Test cracking: | | | | | |
| Relative activity | 32.5 | 35.2 | 36.7 | 41.8 | 39.1 |
| Distillate and loss | 32.0 | 33.5 | 34.1 | 36.7 | 35.4 |
| Gas factor | 1.54 | 1.49 | 1.33 | 1.24 | 1.26 |
| Coke factor | 1.30 | 1.21 | 1.13 | 1.08 | 1.01 |
| Gas gravity | 1.10 | 1.10 | 1.22 | 1.26 | 1.29 |

These tests show the benefits of chelating and ammonium washes over a mere aqueous wash and also show the beneficial effects of metals removal on cracking results, such metals removal giving greater activity to the catalyst and better products (gas gravity) as well as reducing unwanted side effects (coke factor).

Table III, below, shows the effect of solutions containing varying amounts of various chelating acids in poison removal. Each sample reported in Table III was a portion of base catalyst 1 which had been treated with air for 2 hours at about 1300° F., sulfide with H₂S for 1 hour at about 1175° F. and treated with chlorine gas for 1 hour at about 600° F. The chelating wash lasted 10 minutes and temperature was at room temperature (76–78° F.), except for sample P which was washed at about 112–135° F.

Table III

| Sample | Reagent | Percent (on cat.) | Percent solid in wash | Slurry pH | Metal removal (percent) | | |
|---|---|---|---|---|---|---|---|
| | | | | | Ni | V | Fe |
| A | none | | 20 | 2.9 | 76 | 4 | −11 |
| B | do | | 20 | 3.2 | 69 | 6 | −12 |
| C | do | | 5 | 3.6 | 66 | 8 | −14 |
| D | formic | 4.1 | 20 | | 74 | 15 | −6 |
| E | fumaric | 4 | 20 | | 74 | 15 | −11 |
| F | maleic | 4 | 20 | | 74 | 22 | 1 |
| G | lactic | 4.2 | 20 | 2.4 | 73 | 26 | 4 |
| H | glycolic | 4.2 | 20 | 2.4 | 73 | 24 | 4 |
| I | citric | 2 | 20 | 2.6 | 71 | 20 | 19 |
| J | tartaric | 2 | 20 | 2.1 | 67 | 19 | 20 |
| K | do | 4 | 20 | 2.0 | 75 | 29 | 25 |
| L | oxalic | 1 | 9.4 | 3.0 | 70 | 12 | 1 |
| M | do | 1 | 20 | 2.7 | 74 | 14 | 5 |
| N | do | 2 | 20 | 1.6 | 72 | 29 | 24 |
| P | do | 2 | 20 | 2.8 | 69 | 4 | −10 |
| Q | do | 4 | 20 | 1.2 | 66 | 30 | 26 |
| R | do | 4 | 5 | 1.9 | 69 | 24 | 23 |
| S | do | 4 | 20 | 1.3 | 61 | 23 | 22 |
| T | do | 8 | 5 | 1.7 | 69 | 22 | 22 |

NOTE.—Percent oxalic and citric acids calculated as the common hydrates.

It will be noted from Table III that with samples A to E where no chelating agent was present, the wash was ineffective to remove Fe although, being acid, it served for some removal of other poisoning metal. Also, the examples which use the acid of limited solubility, oxalic acid, are greatly affected by the concentration of the acid and by oxalic acid's tendency to decompose when heated. Samples I, J and K which use solutes having four functional groups in the molecule are shown to be highly effective chelating agents.

Samples 83, 87 and 58 used semi-synthetic catalysts prepared by depositing synthetic alumina on clay. The base for samples 83 and 87 had been poisoned in a pilot plant and sample 58 was poisoned in a commercial process. Each poisoned catalyst sample was used to test-crack feedstock B, and then the samples were treated with air for one hour at 1300° F., with H₂S for one hour at 1175° F. The samples were chlorinated with a saturated mixture of Cl₂ and CCl₄ for one hour at 600° F. and then treated with a tap water mixture with the reagent and at the pH given in the table. After drying and calcination each sample was analyzed and used to test crack feedstock B. The results are given in Table IV.

Table IV

| Sample | Base | 83 | 87 | Base | 58 |
|---|---|---|---|---|---|
| Wash: | | | | | |
| Reagent | | none | (1) | | (1) |
| Percent reagent | | | 1.8 | | 2.6 |
| pH | | 2.3 | 2.1 | | 2.0 |
| Removal (Percent): | | | | | |
| Ni | | | 61 | 65 | | 67 |
| V | | | 40 | 37 | | 5 |
| Fe | | | 11 | 41 | | 30 |
| Test Cracking: | | | | | |
| RA | 24.4 | 28.3 | 31.7 | 25.3 | 28.7 |
| D+L | 26.6 | 29.3 | 31.5 | 27.3 | 29.9 |
| GF | 1.73 | 1.37 | 1.13 | 1.33 | 1.24 |
| CF | 1.30 | 1.13 | 0.85 | 1.20 | 1.10 |
| GG | 0.93 | 1.11 | 1.25 | 1.19 | 1.24 |

1 Citric acid.

This application is a continuation-in-part of copending application Serial No. 55,838, filed September 14, 1960, now forfeited.

It is claimed:

1. A method for removing metal contaminant from a synthetic gel, silica-based catalyst which has been poisoned by contamination with a metal selected from the group consisting of nickel and vanadium due to use of said catalyst in cracking at elevated temperature a hydrocarbon feedstock containing said metal, said cracking including a catalytic cracking zone and a catalyst regeneration zone between which the catalyst is cycled and in which cracking zone the catalyst becomes contaminated with said metal of said hydrocarbon feedstock and in which regeneration zone carbon is oxidized at an elevated temperature and thereby removed from the catalyst, the steps comprising bleeding a portion of the metal-contaminated catalyst from the cracking system, sulfiding bled catalyst by contact with a sulfiding vapor at about 500–1500° F. to improve nickel removal from said catalyst, chlorinating the sulfided catalyst by contact with chlorinating vapors at about room temperature to 900° F. to enhance vanadium removal from said catalyst, washing the chlorinated catalyst with an aqueous solution containing a chelating agent for said contaminants to remove said contaminants, returning resulting decontaminated catalyst to a hydrocarbon cracking system and cycling returned catalyst between the cracking zone and the catalyst regeneration zone.

2. The method of claim 1 in which the chelating agent is an organic acid containing an —OH group in addition to a carboxyl group.

3. The method of claim 2 in which the chelating agent is citric acid.

4. The method of claim 1 in which the chelating solution contians about 0.1 to 10% chelating agent based on the weight of the catalyst.

5. The method of claim 1 in which the catalyst is a silica-alumina catalyst.

6. The method of claim 5 in which the catalyst is a synthetic gel alumina on a silica-alumina substrate derived from clay.

7. The method of claim 5 wherein the catalyst is chlorinated by contact with chlorine vapors at about 450 to 650° F.

References Cited in the file of this patent

UNITED STATES PATENTS

| | | |
|---|---|---|
| 2,388,302 | Weyl | Nov. 6, 1945 |
| 2,481,253 | Snyder | Sept. 6, 1949 |
| 2,488,744 | Snyder | Nov. 22, 1949 |
| 3,020,239 | Flinn et al. | Feb. 6, 1962 |

FOREIGN PATENTS

| | | |
|---|---|---|
| 596,177 | Canada | Apr. 12, 1960 |